Sept. 30, 1958 K. O. SEILER 2,854,363

METHOD OF PRODUCING SEMICONDUCTOR CRYSTALS
CONTAINING P-N JUNCTIONS
Filed March 31, 1954

INVENTOR
K. O. SEILER
BY Philip M. Bolton
ATTORNEY

United States Patent Office 2,854,363
Patented Sept. 30, 1958

2,854,363

METHOD OF PRODUCING SEMICONDUCTOR CRYSTALS CONTAINING P–N JUNCTIONS

Karl O. Seiler, Nurnberg, Germany, assignor to International Standard Electric Corporation, New York, N. Y., a corporation of Delaware Application March 31, 1954, Serial No. 420,156

Claims priority, application Germany April 2, 1953

5 Claims. (Cl. 148—1.5)

The invention relates to a method of making crystals of germanium, silicon or other semiconductors and is particularly concerned with the problem of producing p–n, p–n–p-layers, etc. in a systematic manner.

P–n crystals of germanium or silicon with zones of different types of conductivity are already known according to the prior art and have been used for the manufacture of rectifiers and transistors. The manufacture of p–n-layers or p–n–p-layers respectively, has been hitherto executed in such a manner, that during the growth of a crystal according to the Czochralski method, the molten mass has been converted by the insertion of a selected quantity of impurity substance.

The Czochralski method may be briefly described as a method wherein a small seed of germanium is touched to the surface of the molten germanium metal and a crystal begins forming on the seed. As it forms, the crystal is drawn slowly from the molten metal.

Another conventional method of making said crystals is to diffuse impurity substances into one or two sides of a germanium body. Further it is known to produce p–n-layers by means of a heat treatment so that an imperfection is produced in the crystal lattice and is made permanent by a rapid cooling of the semi-conductor to room temperature.

All of the above-mentioned arrangements or methods have the disadvantage of enabling the manufacture of only one single p–n-crystal at a time.

The present invention arises from the recognition that the imperfection in the crystal, which is produced by the temperature treatment will only be preserved in a semiconductor like germanium after it is cooled if certain impurity substances are present therein or have been added at least at the surface of the crystal. The present invention provides for the insertion of impurities so that the resultant heat produced imperfection in the crystal is retained in producing the p–n-crystal.

The above-mentioned and other features and objects of this invention and the manner of attaining them will become more apparent and the invention itself will be best understood, by reference to the following description of embodiments of the invention taken in conjunction with the accompanying drawings, wherein.

Figure 4A:
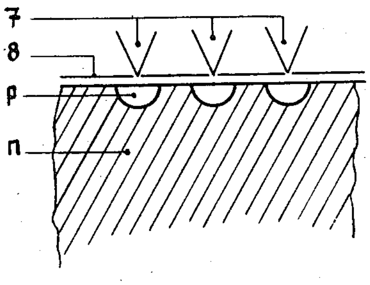
Figure 4B:
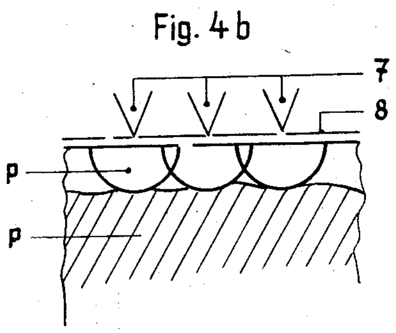
Figure 5:
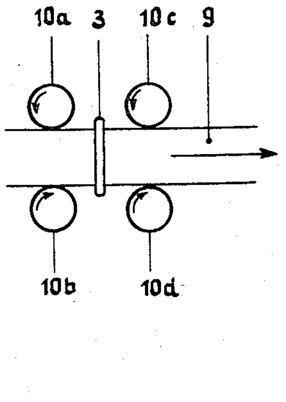
Figure 3A:
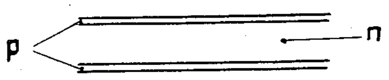
Figure 3B:
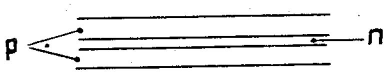

Figs. 3*a* and 3*b* illustrate the different thicknesses of the p–n-layers depending upon the rate of withdrawal of the crystal from the molten mass;

Figs. 4*a* and 4*b* illustrate the production of zones of one conductivity type on one surface of a crystal of another conductivity type, and Fig. 5 illustrates the process of the present invention as applied to already finished crystals.

Figure 1:
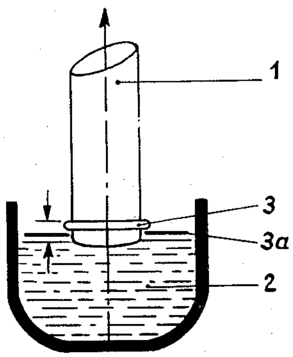
Fig. 1 illustrates one process of making and treating crystals to provide for different conductivity zones.

In one example of the present invention, as the crystal is being drawn out of the molten mass, preferably according to the before described Czochralski method, the surface of the still-hot portion of the solid crystal is provided with suitable impurities. Referring to Fig. 1, the application of the impurities to the crystal 1, which is being drawn out of the molten mass 2 in the direction indicated by the arrow, can be effected by means, for example, of a wire ring 3 of copper which is arranged just above the level of the molten mass. This wire ring is heated to evaporate impurities, thus effecting a change of conductivity on the surface of the crystal to a desired depth. For this purpose those substances are particularly well adapted which have a high separating coefficient because these substances will not mix with the germanium when falling in the molten mass, thus requiring no special arrangements for preventing the impurities from going into the molten mass. It may be desirable to provide suitable means to prevent these impurities from falling into the molten mass itself such as for example by providing a shield **3*a*** around the under part of the ring or the like. In any event it is to be noted that the higher the separating coefficient of the impurity substance is the less likelihood of this substance mixing with the molten germanium and impuring the drawn crystal. Besides copper, nickel may be used for this purpose. All the substances classified in the first and second group of the periodic system of the elements are suitable for the requirements stated above. The solid substances or the liquids are vaporized and the vapour is blown against the hot surface of the drawn-out germanium crystal. Gases or vapours are brought to the hot germanium surface e. g. by help of an annular tube with suitable openings through which the gas or vapour is blown against the germanium surface.

Figure 2:
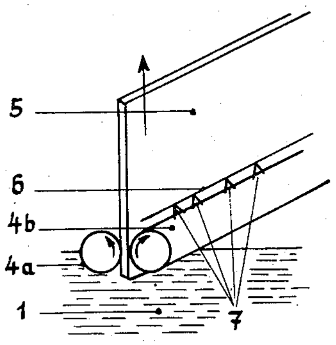
Fig. 2 illustrates to a modification of the process in which the crystal is plate-like in form.

In the modification of Fig. 2 the crystals are in the form of plates. As may be seen from the drawing there is arranged just above the level of the molten mass 1, two rollers **4*a* and 4*b*, serving to draw the plate-like monocrystal 5 out of the molten mass in the direction indicated by the arrow. According to the invention, there is arranged above one of the rollers and in front of one side of the crystal, a wire 6 which is capable of being annealed or heated and will effect the evaporation of the impurity substances onto the surface of the crystal. Instead of a heated wire, there can be also employed metal points 7**, e. g. suitably arranged and pointed wires or pins, which may be grouped in a desired arrangement either transversely to the direction of movement of the crystal or else around the crystal.

The material of the wire which is heated or of the gas or vapour which is blown against the germanium surface either consists of impurity substances or the impurity substances are incorporated in the said material consisting of other substances inactive to the semiconductor.

From both the above examples it may be seen that a p–n-crystal can be produced in a systematic manner. Depending on the rapidity by which the crystal is drawn out of the molten mass, there will be produced either p–n or p–n–p-layers of the kind as shown in Fig. 3*a*, quickly drawn-out, or Fig. 3*b*, slowly drawn out. The crystal shown in Fig. 3*a* is cut along the middle axis into two p–n-crystals.

The relationship of the layer thickness can also be affected by the duration of the heating of the impurity source. At longer heating periods of the impurity source the depth of the diffusion of the impurity in the crystal is greater. For example, Fig. 4*a* shows the production of p-zones on a n-semi-conducting crystal when heating the pointed wires for a short period and at lower drawing velocity which points are separated from the crystal by means of a shield 8 provided with corresponding apertures near the points of the wires. In Fig. 4*b* it is shown that in the case of a longer lasting heating, the p-zones overlap each other so that a uniform p-layer is formed on the n-semi-conducting crystal. From the foregoing description it will be obvious that various other modifications may be employed in accordance with the present invention. For example, the rollers used for advancing the plate-like crystal of Fig. 2 may be used to effect and increase cooling of the crystal or produce an additional heating to thereby set up a predetermined distribution of temperature in order to control the diffusion of the impurities into the semi-conductor. In this manner for example a crystal can be effected throughout its entire depth homogeneously with impurities by suitably heating the semi-conducting body and by a suitable arrangement of the impurity sources for a uniform feeding of impurities and for deep diffusion thereof. In this manner p–n-layers can be obtained successfully following each other in the direction of drawing forth of the crystal from the molten mass. Likewise the impurities may be distributed locally at spaced points or equally over the whole surface of the crystal.

The method described may also be applied to finished crystals. As shown in Fig. 5 a finished crystal 9 may be led through a system of 4 rollers 10*a–d* in the direction indicated by the arrow. Two of the rollers, for example rollers 10*a* and 10*b* heat the crystal while the other two rollers 10*c* and 10*d* cool it. Between these rollers, that is in the heated zone there is provided a ring 3 of copper or the like from which as described hereinbefore, impurities will be evaporated onto the crystal in the desired manner.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In the method of making a semi-conductor having areas of different conductivity types, steps comprising drawing a crystal from a molten mass of the semi-conductive material of one conductivity type and evaporating an impurity of an opposite conductivity type on to the drawn crystal while it is being drawn out of the mass and is still in a heated state.

2. A method according to claim 1 further comprising shielding the mass from the vapors of the impurity.

3. A method according to claim 1 in which the impurity is evaporated by heating a wire of the impurity material at a point close to the surface of the molten mass.

4. A method according to claim 1 in which said vaporized impurity is directed on to the crystal at spaced points therealong.

5. The method of making a semi-conductive element for signal translating devices which comprises vapor depositing a material selected from the group of P–N impurities upon a body of semi-conductive material selected from the group consisting of germanium and silicon while said semi-conductive material is being drawn from a molten mass and is still in a heated state.

References Cited in the file of this patent

UNITED STATES PATENTS

| | | |
|---|---|---|
| 2,657,457 | Toulmin | Nov. 3, 1953 |
| 2,665,225 | Godley | Jan. 5, 1954 |
| 2,683,676 | Little et al. | July 13, 1954 |
| 2,695,852 | Sparks | Nov. 30, 1954 |